(12) United States Patent
Miranda et al.

(10) Patent No.: US 7,964,979 B2
(45) Date of Patent: Jun. 21, 2011

(54) CONTROL METHOD FOR A WIND TURBINE

(75) Inventors: Erik Carl Lehnskov Miranda, Randers SV (DK); Imad Abdallah, Århus C (DK); Poul Brandt Christensen, Ry (DK); Ali Zaib, Alaborg (DK); Thomas Tvilum Bachmann, Ålborg (DK)

(73) Assignee: Vestas Wind Systmes A/S, Randers SV (DK)

( * ) Notice: Subject to any disclaimer, the term of this patent is extended or adjusted under 35 U.S.C. 154(b) by 0 days.

(21) Appl. No.: 12/895,932

(22) Filed: Oct. 1, 2010

(65) Prior Publication Data
US 2011/0084485 A1 Apr. 14, 2011

Related U.S. Application Data

(60) Provisional application No. 61/249,885, filed on Oct. 8, 2009.

(30) Foreign Application Priority Data

Oct. 8, 2009 (DK) .......................... PA 2009 01106

(51) Int. Cl.
*F03D 9/00* (2006.01)
*H02P 9/04* (2006.01)
(52) U.S. Cl. .......................................... 290/44; 290/55
(58) Field of Classification Search .................... 290/44, 290/55
See application file for complete search history.

(56) References Cited

U.S. PATENT DOCUMENTS

| | | | | |
|---|---|---|---|---|
| 4,357,542 | A * | 11/1982 | Kirschbaum | 290/44 |
| 5,477,114 | A * | 12/1995 | Yamada et al. | 318/457 |
| 5,798,631 | A * | 8/1998 | Spee et al. | 322/25 |
| H2057 | H * | 1/2003 | Veers et al. | 416/230 |
| 6,866,024 | B2 * | 3/2005 | Rizzoni et al. | 123/430 |
| 6,909,198 | B2 | 6/2005 | Ragwitz et al. | 290/44 |
| 7,175,389 | B2 | 2/2007 | Moroz | 416/1 |

(Continued)

FOREIGN PATENT DOCUMENTS

DE 10232021 7/2002
(Continued)

OTHER PUBLICATIONS

Examination conducted by the Denmark PTO dated May 19, 2010.

*Primary Examiner* — Pedro J Cuevas
(74) *Attorney, Agent, or Firm* — Cohen Pontani Lieberman & Pavane LLP

(57) ABSTRACT

A method of controlling a wind turbine, where a control signal for a controllable parameter of the wind turbine is determined, and the rotor power coefficient, the torque coefficient, and/or a thrust coefficient of the wind turbine are estimated at time intervals. From this is determined a variation parameter reflecting the variation of the estimated rotor power, torque or thrust coefficient over time. The wind turbine is then controlled according to the control signal only if the variation parameter is below an alert threshold, and otherwise according to a modified control strategy. The control signal may have a power or torque reference signal for controlling the rotational speed of the turbine or a blade pitch reference signal. The modified control method may for instance entail stopping or de-rating the wind turbine. A control system configured to perform the above control method, and a wind turbine comprising such system are also disclosed.

15 Claims, 5 Drawing Sheets

U.S. PATENT DOCUMENTS

| | | | |
|---|---|---|---|
| 7,352,076 B1 * | 4/2008 | Gabrys | 290/44 |
| 7,393,177 B2 * | 7/2008 | Rahai et al. | 415/4.2 |
| 7,476,985 B2 | 1/2009 | Gonzalez | 290/44 |
| 7,488,155 B2 | 2/2009 | Barbu et al. | 416/1 |
| 7,761,190 B2 * | 7/2010 | Delmerico et al. | 700/297 |
| 7,830,029 B2 * | 11/2010 | Wobben | 290/44 |
| 2004/0096327 A1 * | 5/2004 | Appa et al. | 416/1 |
| 2007/0120369 A1 * | 5/2007 | Delmerico et al. | 290/44 |
| 2009/0060740 A1 | 3/2009 | Stiesdal et al. | 416/41 |
| 2009/0097981 A1 * | 4/2009 | Gabrys | 416/204 R |
| 2009/0224542 A1 | 9/2009 | Nim | 290/44 |
| 2009/0224543 A1 | 9/2009 | Steudel et al. | 290/44 |
| 2009/0257873 A1 | 10/2009 | Egedal et al. | 416/1 |
| 2009/0295159 A1 | 12/2009 | Johnson et al. | 290/44 |
| 2009/0295160 A1 | 12/2009 | Wittekind et al. | 290/44 |
| 2010/0098540 A1 * | 4/2010 | Fric et al. | 416/36 |

FOREIGN PATENT DOCUMENTS

| | | |
|---|---|---|
| EP | 2096301 | 9/2009 |
| WO | WO 2007/123552 | 11/2007 |

* cited by examiner

CONTROL METHOD FOR A WIND TURBINE

RELATED APPLICATIONS

This application claims priority from Denmark Application No. PA 2009 01106 which was filed on Oct. 8, 2009 and U.S. Provisional Application No. 61/249,885 filed on Oct. 8, 2009, the content of which are incorporated by reference.

The present invention relates to a strategy for controlling and regulating the different controllable parameter (such as e.g. a blade pitch angle, a position of a flap, and/or other means for changing the aerodynamic surface of a blade) of a wind turbine during operation with a view to reduce any severe or extreme loads acting on the wind turbine components. The invention furthermore relates to a method for reducing the tilt moments of the wind turbine arising for instance due to large changes in the wind direction or wind speed.

BACKGROUND

Most modern wind turbines are controlled and regulated continuously most often with the purpose of ensuring maximum power extraction from the wind under the current wind, weather, while at the same time ensuring that the loads on the different components of the wind turbine are at any time kept within acceptable limits. Desirably, the wind turbine may also be controlled to account for fast local variations in the wind velocity—the so-called wind gusts, and take into account the dynamic changes in the loads on the individual blades due to e.g. the passing of the tower or the actual wind velocity varying with the distance to the ground (the wind profile).

To this purpose a number of parameters are collected and monitored by the controllers in a wind turbine, such as for instance the current wind speed and direction, the wind shear and turbulence, the rotational speed of the rotor, the pitch angle of each blade, the yaw angle, information on the grid system, and measured parameters (e.g. stresses or vibrations) from sensors placed e.g. on the blades, the nacelle, or on the tower.

Based on these and following some control strategy the optimal control parameters of the turbine in order to perform optimally under the given conditions are determined. The methods of controlling the current performance, and thereby the power production and the load situation of the wind turbine, include for instance pitching of the blades, adjusting any different active aerodynamic devices for changing the aerodynamic surfaces of the blades such as flaps or vortex generating means, adjusting the power, and/or adjusting the rotational speed of the rotor. These parameters are here and in the following referred to as controllable parameters.

Sudden or abrupt changes in the wind conditions such as drops in the wind speed and large wind direction changes etc., may,—if the control strategy of the wind turbine is not determined or executed fast enough,—result in very high and unacceptable loads and moments in some of the components of the wind turbines, e.g. in the tower due to an undesirable pitching of one or more of the blades, or in the gears due to erroneous adjustments of the power. Such loads may be of considerable sizes and may in the worst case scenario in the extreme situations or over time lead to fatal damage of the turbine. Irrespective that the probability for such extreme situations to arise may be minimal, the possible implications are unacceptable, creating the need for fail-safe control methods capable of preventing these possibly rare but extreme eventualities.

Such wind load cases therefore need to be considered in the design and in the continuous control of the wind turbine to assure its structural integrity. Examples of extreme wind load conditions are prescribed in the IEC 61400 code and comprise among others the Extreme Operating Gust (EOG) load case, the Extreme Coherent gust with Direction change (ECD) load case, the Extreme Direction Change, the Extreme Coherent Gust (ECG), and the Extreme Wind Shear (EWS) load case.

Known controlling systems comprise using a measured or estimated wind speed and/or detecting the wind direction using a wind vane directly to determine the controllable parameters. However, such systems have in some situations and especially in extreme wind conditions turned out to be too slow or too inaccurate to detect the wind load condition changes in due time for the turbine to perform optimally, and may therefore be insufficient and in some cases even inadequate to protect the turbine.

SUMMARY OF THE INVENTION

It is therefore an object of embodiments of the present invention to provide a control method for a wind turbine which obviate or reduce some of the above mentioned problems in known controlling methods.

It is a further object of the invention to provide a control method which in a simple and effective way may react faster and more reliable to changes in the wind load conditions, especially to sudden or large changes in the wind direction, wind shear, and/or wind speed.

In accordance with an embodiment of the invention this is obtained by a method of controlling a wind turbine, comprising the steps of:
  determining a control signal for a controllable parameter of the wind turbine;
  estimating at time intervals at least one of a rotor power coefficient, a torque coefficient, and a thrust coefficient of the wind turbine,
  determining a variation parameter reflecting a variation of the estimated rotor power coefficient, torque coefficient, and/or thrust coefficient over time,
  controlling the wind turbine according to the control signal only if the variation parameter is below an alert threshold, and
  controlling the wind turbine according to a modified control strategy if the variation parameter is above the alert threshold.

The control method according to an embodiment of the invention hence comprises a control signal supervision strategy for avoiding severe or extreme load situations on a wind turbine, where the rotor power coefficient, the torque coefficient, and/or the thrust coefficient are determined at each time step, and the variations in time hereof are used as a basis for deciding whether the wind turbine should be controlled differently, for instance by being stopped if some alert threshold is exceeded.

The hereby obtained control method is advantageous in acting as a system detecting and reacting on large changes or variations in the wind load conditions in a simple yet effective way, which wind condition changes may otherwise lead to severe or even extreme load situations in different wind turbine components such as the tower, the blades, the generator, the gears etc. In worst case scenarios such extreme loads may result in fatal damage of the wind turbine, as e.g. ultimately result in breaking of the tower, and are therefore unacceptable. The supervision according to the control method ensures in a simple yet effective manner that the risk of extreme load situations and loads leading to fatigue damage is greatly reduced or even avoided by overruling the controlling otherwise decided on, and by following a modified control strategy instead in the case of large variations in the rotor power, torque, and/or thrust coefficient found to reflect large changes in the wind load conditions, e.g. by de-rating or shutting down the wind turbine completely.

The wind load conditions may include average and/or absolute wind speed, wind shear, wind direction, in particular relative to the rotor plane, areas of wind shade, wind field variations, turbulence factor etc.

It is an advantage of the method of the present invention that it can be readily applied to existing wind turbines without the requirement of additional components or hardware equipment.

As briefly mentioned in the introduction, the controllable parameter may for instance comprise the individual or collective pitching of the blades, the yaw, or coning of the rotor, the rotational speed of the rotor, the power, the generator speed, or some adjusting parameters for any different active aerodynamic devices for changing the aerodynamic surfaces of the blades such as flaps or vortex generating means.

The control signal may comprise a power or torque reference signal for controlling the rotational speed of the wind turbine rotor by changing the power or torque.

The control signal may alternatively or additionally comprise a pitch reference signal for controlling the pitching of the blades of the wind turbine. The pitch reference signal may comprise the value of the pitch reference for each individual wind turbine blade, and/or the value of the collective pitch reference, so that the control method may be performed on each of the individual blade pitch references and/or on the mean (the collective pitch reference) of these.

The step of determining a control signal for a controllable parameter may be preformed in the same or in different controllers and based on input from various sensors such as load sensors on the blades or rotor shaft, accelerometers in the nacelle, anemometers etc.

The time intervals at which the rotor power, torque, and/or thrust coefficient and its variation are determined may vary according to need and can for instance be determined continuously or at varying interval lengths dependent for instance on the turbulence conditions, on the current wind direction, on the ambient temperature etc.

According to an embodiment of the invention, the variation of the rotor power, torque, and/or thrust coefficients of the wind turbine are used to determine which control strategy should be employed. This is advantageous in that these coefficients are characteristic for the wind turbine and are found to reflect changes in the wind load conditions, such as turbulence, gusts, abrupt changes caused by weather front passages, wind shear, and wind direction changes with or without simultaneous changes in the wind speed. A possible explanation for the advantage in using the rotor power, torque and/or thrust coefficients may be that these coefficients comprise less noise as they reflect the total rotor power, torque, or thrust averaged spatially and not only in a single or a few spatial points. The coefficients hence are not disturbed by local fluctuations to the same degree as e.g. wind vane measurements and are further not averaged over time whereby they may reflect the changes in the wind load conditions earlier or faster. Measurements of the wind directions from a wind vane on the contrary will fluctuate due to the rotor and nacelle movements, will therefore need to be filtered resulting in a delay, adding to make a wind turbine control based hereon slower. A control method based directly on the measured or estimated wind speed may similarly be inaccurate and unsuitable, as the controlling is then based on the wind speed in one point in space only and as changes to this one parameter may not reflect similar changes in the overall wind speed.

Furthermore, the control method according to the invention is advantageous as the changes in the rotor power, torque, or thrust coefficients may be detected very early time wise compared to conventional supervision methods based on e.g. wind vane and direct wind speed measurements. Thereby the wind turbine control method may react faster to especially sudden or extreme changes in the wind load conditions, which may give the time needed for the chosen control strategy to actually be effectuated on the wind turbine in time to avoid the undesirable high loads and moments otherwise resulting from yaw-errors,—even for large wind turbines where the control may be relatively slow due to the very long blades, heavy components etc.

The control method according to an embodiment of the invention is further advantageous in leaving the wind turbine control unaffected during normal operation, whereby the normal operation mode is left undisturbed and the power produced by the wind turbine is not unnecessarily reduced in non-critical wind load conditions.

The modified control strategy may in one embodiment of the invention comprise stopping or de-rating the wind turbine whereby the undesirable large loads otherwise resulting from the severe wind load conditions are effectively and in a simple way avoided and prevented. A de-rating control strategy may e.g. include a reduction of the power reference, a reduction of the rotational speed, collective blade pitching out of the wind (optionally combined with individual pitching of the blades) or a combination of two or three of these control schemes. Stopping may be achieved e.g. gradually or step wise slowing the turbine down to a halt, or by pitching the blades completely out of the wind.

Further, the modified control strategy may comprise controlling the wind turbine according to the control signal prior to the most recent control signal, whereby the wind turbine is controlled in a safe mode and the undesirable extreme loads otherwise resulting from the severe wind load conditions are effectively prevented without largely influencing the productivity of the wind turbine.

The rotor power coefficient expresses how efficiently the wind turbine converts the wind energy into power and is given as the ratio of the power extracted by a wind turbine to the power available in the wind stream. The torque coefficient may be expressed in terms of the rotor power coefficient divided by the blade tip ratio.

The rotor power coefficient, the torque coefficient, and the thrust coefficient of the wind turbine may be determined from a pitch angle of one or more of the wind turbine blades, from the generator speed, the rotor speed, and/or the rotor power. Further, the rotor power coefficient, the torque coefficient, and/or the thrust coefficient may be determined from the wind speed either as estimated or as measured directly. Also, the coefficients may partly be determined by look up in predetermined tables. The rotor power coefficient, the torque coefficient, and the thrust coefficient may hence in most cases be determined from already available information with no need for additional sensors on the wind turbine.

In an embodiment of the invention the variation parameter is determined by filtering the at least one of the rotor power coefficient, the torque coefficient, and the thrust coefficient of the wind turbine. Hereby is obtained a variation parameter expressing the time wise variation of one or more of the coefficients which may be realized in existing control systems by simple means optionally by upgrading of existing systems and without the need for additional measurements. Different types of filters may be employed such as fast and slow low pass filters, $1^{st}$ or higher orders filters, a Kalman filter or by the application of Fast Fourier transformation.

In a further embodiment of the invention the variation parameter is determined as a function of the difference between a fast and a slow low pass filtered rotor power efficiency, torque coefficient, and/or thrust coefficient, hereby by a simple algorithm obtaining an effective measure for the time dependent variation of the one or more coefficients in question. The variation parameter in this way reflects a sudden or abrupt change of the coefficient in question.

In an embodiment of the invention the variation parameter is determined as a function of a pitch angle of one or more of the wind turbine blades, the acceleration of the wind turbine tower and/or the drive train speed of the wind turbine. Hereby the variation parameter may be tuned to more effectively reflect the changes in the wind load conditions, for instance with the purpose of tuning the variation parameter to e.g. avoid exceeding the alert threshold during normal operation of the wind turbine to a higher degree of certainty, or to tune the variation parameter to reflect specific changes in wind load conditions, e.g. be more sensitive to extreme wind direction changes than to extreme wind speed changes etc. Furthermore may as an example be obtained, that the variation parameter is more sensitive (and therefore more prone to cause a the modified control strategy to be initiated) the more the blades are pitched into wind in which case an abrupt wind load condition change would also cause higher tilt and yaw moment than for blades pitched more out of the wind.

In an embodiment, the variation parameter could also be chosen to increase with value of the absolute or mean wind speed. Hereby is obtained a control method which in some situations reacts more promptly to large variations in the wind load conditions, where the possibility of the variation parameter exceeding the alert threshold is larger, and the wind turbine therefore is more likely to be stopped or de-rated. This may for instance be advantageously at higher wind speeds, where the risk of unacceptable large or extreme loads and moments on the wind turbine is correspondingly higher than at lower wind speeds.

In an embodiment of the invention, the alert threshold is a predefined constant, may depend on the most recent control value, and/or may be a function of the wind speed.

The alert threshold may optionally be a function of the other parameters such as e.g. the current wind speed, a turbulence factor, acceleration measurements on the nacelle or the blades, the blade loads, the power production, the generator speed, or the current pitch of the blades, whereby is obtained that the control method in some situations reacts more promptly to large variations in the wind load conditions. In this way a control method where stopping or de-rating of the turbine is more likely could be applied in situations where the consequences of the large changes in wind conditions are more severe, for instance at higher wind speeds.

The present invention relates in another aspect to a control system for a wind turbine configured to perform the steps of:
  determining a control signal for a controllable parameter of the wind turbine;
  estimating at time intervals at least one of a rotor power coefficient, a torque coefficient, and a thrust coefficient of the wind turbine,
  determining a variation parameter reflecting a variation of the estimated rotor power coefficient, torque coefficient, and/or thrust coefficient over time,
  controlling the wind turbine according to the most recent control signal only if the variation parameter is below an alert threshold, and
  controlling the wind turbine according to a modified control strategy if the variation parameter is above the alert threshold.

The invention further relates to a wind turbine comprising a control system according to the above.

The advantages of the above control system and wind turbine are as describes in relation to the method.

BRIEF DESCRIPTION OF THE DRAWINGS

In the following different embodiments of the invention will be described with reference to the drawings, wherein.

DETAILED DESCRIPTION OF THE DRAWINGS

Figure 1:
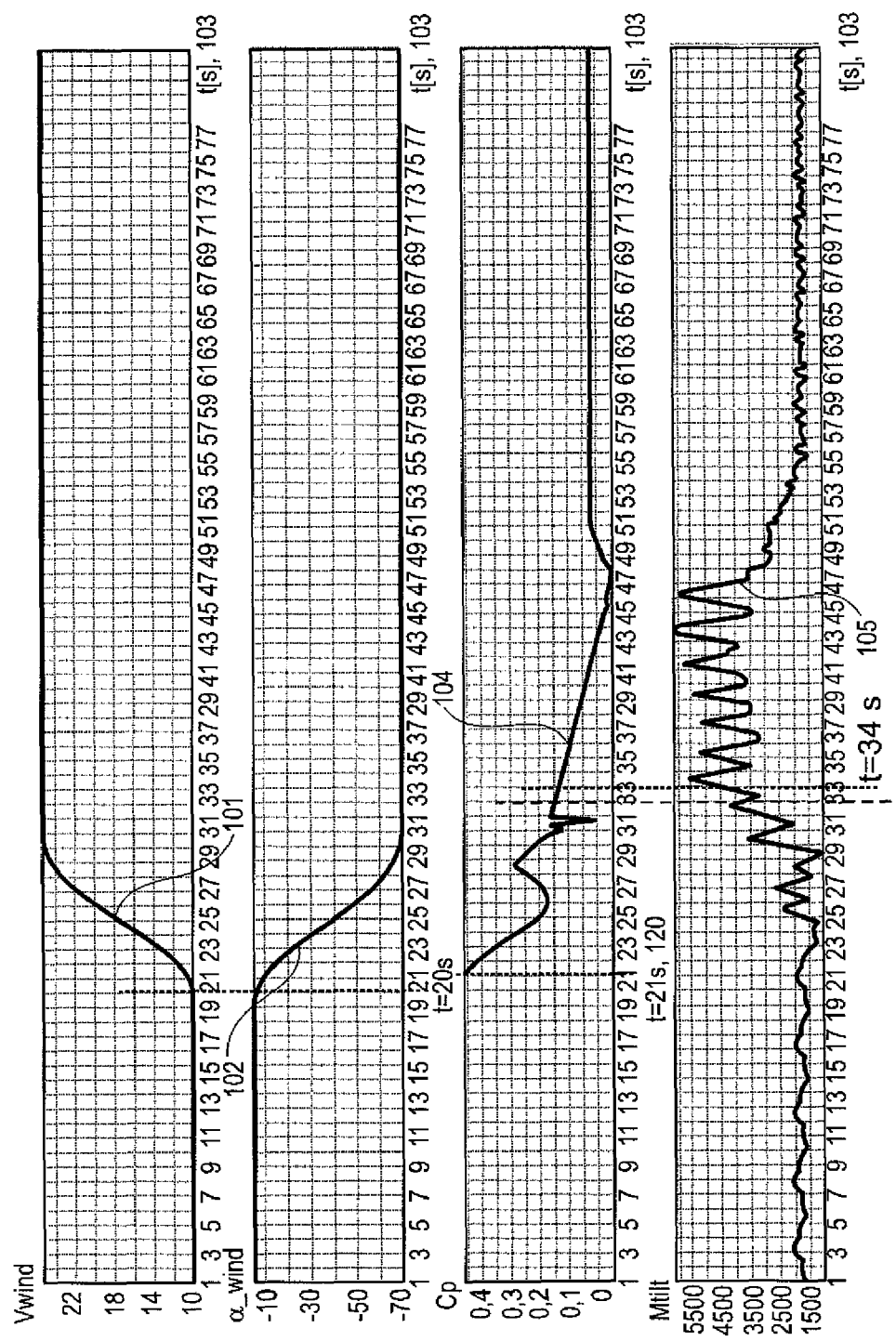
FIG. 1 shows wind parameters as a function of time during an extreme wind direction change and correspondent rotor efficiency and tilt moments for a wind turbine during a control strategy according to prior art.

FIG. 1 shows as the two uppermost curves the absolute wind speed $V_{wind}$, 101 and the wind direction $\alpha_{wind}$, 102 as a function of time t, 103 during a wind load condition case. This specific case illustrates the wind parameters during an Extreme Coherent gust with Direction change load case (ECD) as prescribed in the IEC 61400 code which comprises a range of extreme wind load conditions typically considered in the design of a wind turbine to assure its structural integrity. As can be seen from the curves, the wind direction 102 and speed 101 changes rather abruptly from around t=20 s and the following 10 seconds.

The two lowermost curves show the rotor power coefficient Cp, 104 and the tilt moment $M_{tilt}$, 105 for a pitch regulated variable speed wind turbine with a conventional yaw system based on wind vane measurements during and resulting from the extreme wind speed and direction change.

The rotor power coefficient Cp is defined as the ratio of the actual power output of the turbine to the power present in the free stream of a fluid flowing through the same cross-sectional area:

$$C_p = \frac{P}{\frac{1}{2}\rho V^3 A},$$

where P is the rotor power, ρ is the air density, V is the wind speed, and A is the rotor swept area.

The rotor power coefficient Cp, 104 can hence be calculated and estimated continuously based on the wind speed and the produced rotor power by the wind turbine and as known by a person skilled in the art. The wind speed may be measured e.g. through a nacelle mounted anemometer (mechanical based or ultrasonic), or may be estimated e.g. through hub or blade mounted pressure probes.

The rotor power coefficient may be determined at the same time as determining an estimate for the wind speed from the below equation:

$$f(v) = \frac{1}{2}\rho A_R C_P\left(\theta, \frac{\omega_R R}{v_{est}}\right)v_{est}^3 - P_{ROT} = 0,$$

This method involves the measurements of the pitch angle θ, the rotor speed $\omega_R$, and the rotor power $P_{ROT}$ (generator output estimated mechanical and electrical drive train losses plus acceleration power). The wind speed may then be found by solving the equation in an iterative process as the rotor power coefficient in each iteration step may be determined from look-up tables as a function of the pitch and the tip speed ratio $$\lambda = \frac{\omega_R R}{v}$$

(and hence as a function of the current wind speed estimate).

The rotor torque coefficient CQ is related to the rotor power coefficient as:

$$C_P = \lambda C_Q,$$

where λ is the tip-speed ratio of the turbine. The control method according to the invention and as described in details in the following may hence in general be based equally well on the rotor torque coefficient instead of on the rotor power coefficient.

The tilt moment $M_{tilt}$, 105 is a load moment about an axis which is substantially perpendicular to a longitudinal direction defined by the tower construction of the wind turbine, and substantially perpendicular to an axis defined by a main axle of the drive train of the wind turbine. From FIG. 1 it appears that very high loading (considerably higher than during normal operation) occurs around t=34 s and later.

The high tilt moments may arise for instance due to the generator speed-based pitch control being a relatively slow-acting system unable to follow the steep slopes of the wind speed, or not being designed to react on fast changing wind conditions. Therefore, the thrust coefficient may not be lowered fast enough to compensate for the increased wind speed. As a result, the tower is deflected backwards with the result of excessive tilt moments and bending moments in the tower base. Further, a tilt-yaw controller on the wind turbine may not react fast enough to be able to compensate for the abrupt change in the wind direction resulting in unbalanced loads and moments, and stationary yaw errors leading to the wind turbine being stopped. Similarly, the yaw moments of the hub (i.e. a load moment about an axis which is substantially parallel to and coinciding with a longitudinal direction defined by the tower construction of the wind turbine) may be excessive in extreme wind conditions as described here.

In the load case shown in FIG. 1, a yaw error supervision according to known methods, where any wind direction changes are detected from wind vane measurements, is seen to trigger the alarm causing the stopping of the wind turbine to be initiated at around t=33 s, 110. As can be seen from the lowermost moment curve this is however too late to avoid the large tilt moments $M_{tilt}$, firstly as the tilt moments are already excessive at this time, and secondly as the stopping process in itself takes some time to take effect.

However, the change in the wind condition parameters can be seen from FIG. 1 to be reflected in the rotor power coefficient Cp 104 already from around t=21 s, 120, where the coefficient starts decreasing. This effect is exploited in the controlling method according to an embodiment of the invention to improve the operation of the wind turbine, as will be described in more details in the following.

According to one embodiment of the invention, the controlling strategy of the wind turbine is modified in case a variation parameter Avar being a function of the rotor power coefficient and reflecting a variation hereof over time becomes larger than some alert threshold T. The variation parameter Avar may in one embodiment be determined as the difference between the slow and the fast low pass filtered rotor power coefficient; Avar=$Cp_{slow}$−$Cp_{fast}$.

As long as the variation parameter does not reach or exceed the alert threshold, the control and operation of the wind turbine is not altered, and the wind turbine is controlled as otherwise determined and according the control signals received from the one or more controllers, such as power or torque reference signals for controlling the rotational speed of the wind turbine rotor, or pitch reference signals for controlling the pitching of one or more of the wind turbine blades. The modified control strategy initiated by the variation parameter exceeding the alert threshold may for instance comprise stopping the wind turbine (e.g. by braking or pitching the blades out of the wind according to some stopping strategy), or de-rating the turbine. A de-rating control strategy may e.g. include a reduction of the power reference, a reduction of the rotational speed, collective blade pitching out of the wind (optionally combined with individual pitching of the blades) or a combination of two or three of these control schemes.

Figure 2:
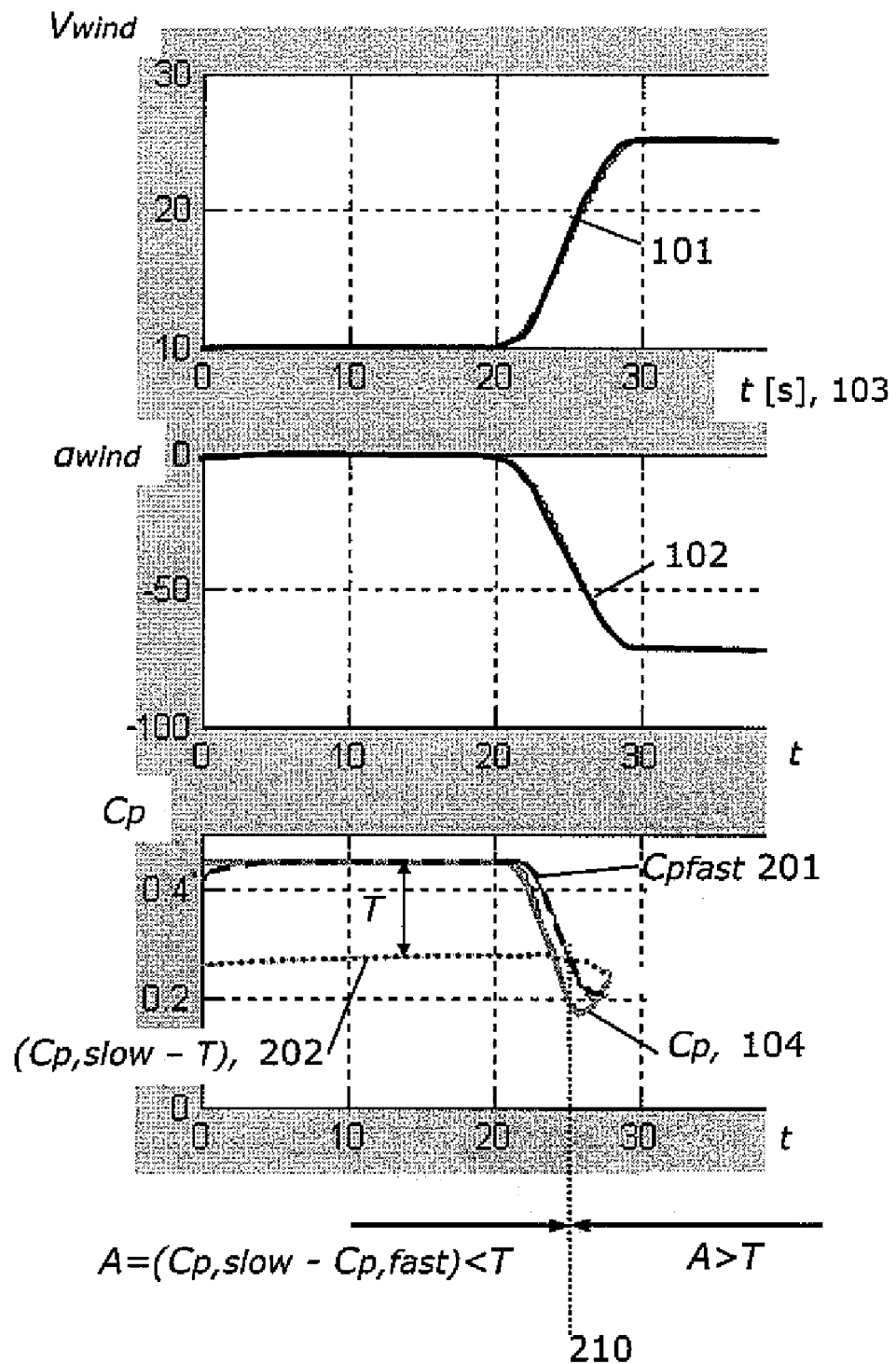
FIG. 2 shows the same extreme wind load case as in FIG. 1.

This strategy is illustrated in FIG. 2 showing the earliest part of the same wind load case as in FIG. 1, with the wind speed $V_{wind}$, 101 and wind direction $\alpha_{wind}$, 102 as a function of time t, 103. One of the curves below show the rotor power coefficient Cp, 104 in a solid grey line as also shown in FIG. 1, and resulting from the wind load condition parameters during normal operation of the wind turbine and estimated or calculated directly or indirectly from the wind turbine power and wind speed as previously described. In a black dashed line is shown the rotor power coefficient filtered with a fast low pass filter $Cp_{fast}$, 201, while the dotted line 202 shows the rotor power coefficient filtered with a slow low pass filter and minus an alert threshold; ($Cp_{slow}$−T), 202. In this embodiment the alert threshold T is a predefined constant equal to T=0.15.

According to one embodiment of the invention, the controlling of the wind turbine is modified in case a variation parameter Avar being a function of the rotor power coefficient and reflecting a variation hereof over time becomes larger than some alert threshold T. The variation parameter Avar is in one embodiment and as illustrated in FIG. 2 determined as the difference between the slow and the fast low pass filtered rotor power coefficient; Avar=$Cp_{slow}$−$Cp_{fast}$.

Under these wind conditions illustrated in FIG. 2, the variation of the rotor power coefficient in time causes the modified control strategy to be initiated at t=25 s, 210, where the curve of the fast filtered $Cp_{fast}$, 201 drops below the curve of the slow filtered value $Cp_{slow}$ minus the fixed value of the alert threshold T, 202, whereby the variation parameter Avar hence becomes larger than the alert threshold, Avar>T.

The filtering applied on the rotor power coefficient is in this case a $1^{st}$ order recursive low pass filter with a user specified time constant:

$$Y_{filt,n} = Y_{filt,n-1}\left(1 - \frac{\Delta t}{\tau}\right) + Y_n \frac{\Delta t}{\tau},$$

where $\tau$ [s] is the filter time constant, $\Delta t$[s]=sampling time step, $Y_n$ is the signal to be filtered and $Y_{filt,n}$ is the filtered signal and n is the sample step number. The speed of the filter (fast or slow) is determined by the magnitude of the time constant. In this embodiment the slow averaging is done using a first order low pass filter on Cp with a time constant of 30 s. The fast averaging is done using the same filter with a time constant of 1 s.

In other embodiments the time dependent variation of the rotor power coefficient may be determined by applying other types of filters such as filters of higher order, a Kalman filter or by the application of Fast Fourier transformation.

The time intervals at which the rotor power coefficient and its variation are determined may vary according to need and can for instance be determined continuously or at varying interval lengths dependent for instance on the turbulence conditions, on the current wind direction, on the ambient temperature etc.

Figure 3:
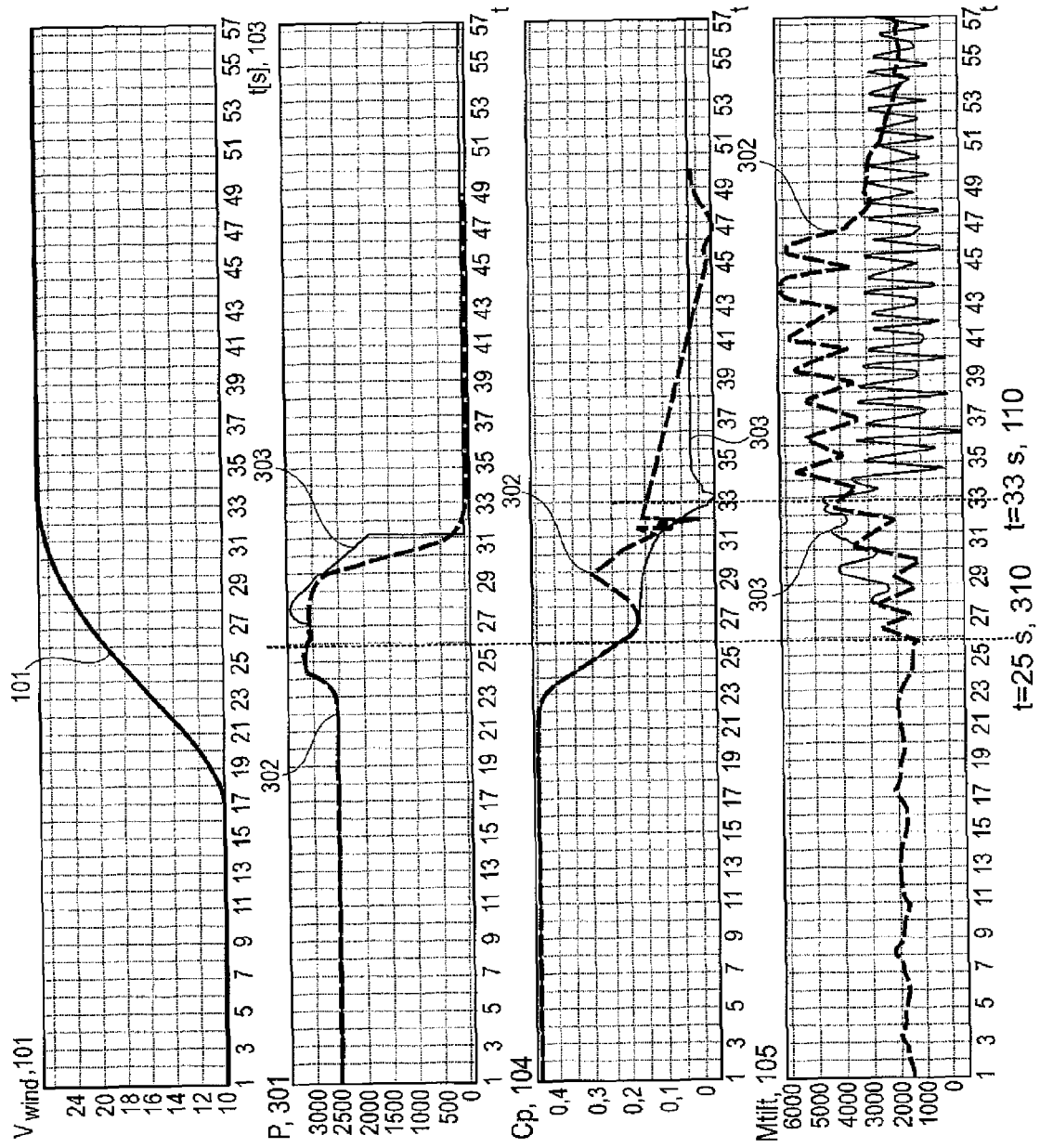
FIG. 3 shows power, rotor power coefficients, and tilt moments resulting from a control strategy according to an embodiment of the invention and compared to the results from a conventional control strategy.
Figure 4:
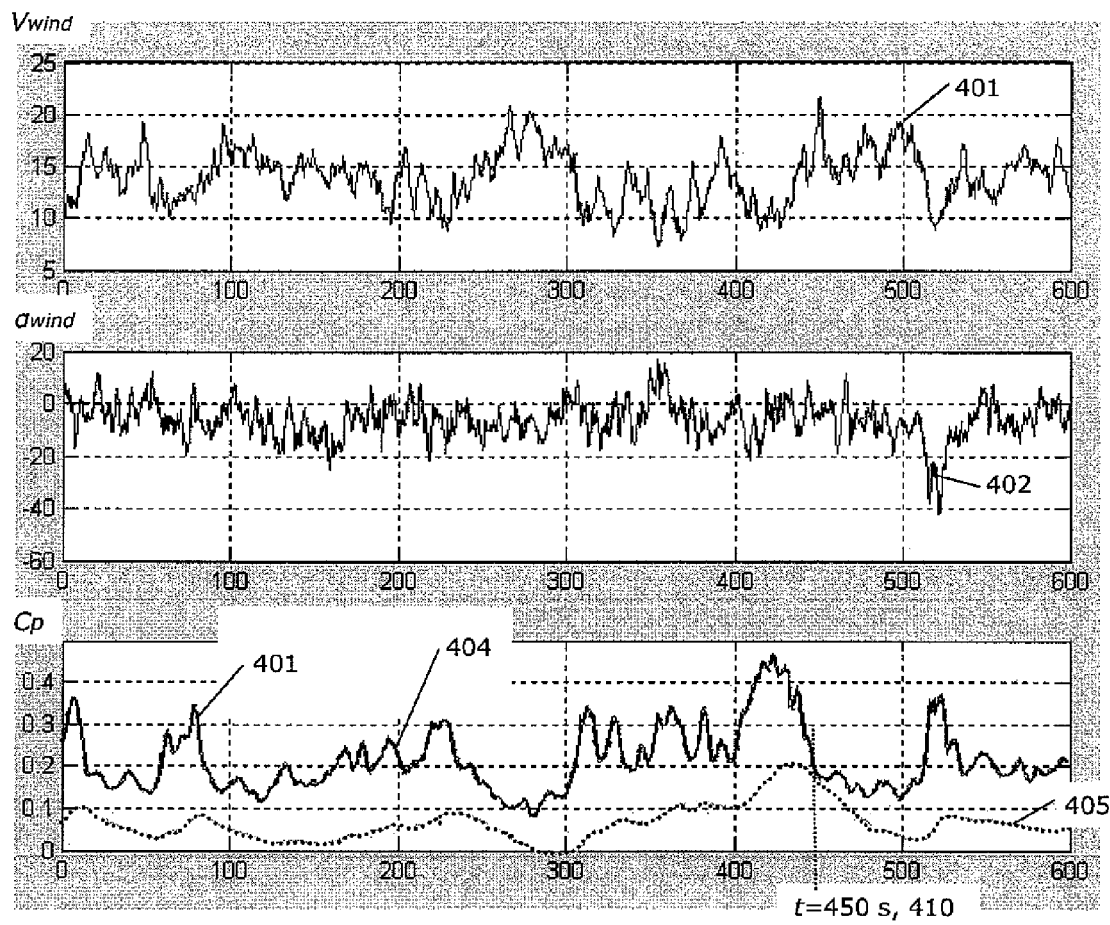
FIG. 4 illustrates the rotor power coefficient and filtered values hereof during a time series with normal production.

The alert threshold which in the shown examples of FIG. 2-4 is preset to a constant of T=0.15 may be chosen e.g. from simulations such that is obtained that the wind turbine is not stopped or de-rated neither too early i.e. under non-critical wind load conditions, nor too late to avoid any extreme loads and moments on the wind turbine components.

The alert threshold may be chosen as a function of parameters directly or indirectly indicating the severity of the wind load condition or load conditions of the turbine, such as for example the current wind speed and wind direction, a turbulence factor, or e.g. current loads or moments in some of the wind turbine components, or the current pitching or pitching history. For instance, an alert threshold T may be used depending on the current pitch of the blades. In case the blades are pitched more into the wind, a relatively sudden change in the wind load conditions would cause higher loads on the rotor blades than if the blades were initially pitched out of the wind. Therefore, an alert threshold T could advantageously be expressed as a function of the pitch such that the control strategy of the wind turbine would be more likely to be altered or modified (a lower T) e.g. by stopping or de-rating, when the risk of intolerable loads caused by changes in the wind conditions is higher.

In FIG. 3 is shown from the top the wind speed 101, the electrical power on the generator side P 301, rotor power coefficient Cp 104, and the tilt moment $M_{tilt}$ 105 as a function of time t, 103, and during the same wind load condition of wind speed and direction change as previously illustrated in the FIGS. 1 and 2. The dashed thick lines 302 for the power, rotor power coefficient, and tilt moment show the parameters without the control method according to the present invention resulting in high tilt moments occurring even though a yaw error supervision according to prior art causes stopping of the wind turbine to be initiated around t=33 s, 110. The solid thin lines 303 show the simulated results resulting from the control method according to one embodiment of the invention as described above, and where the use of the time dependent variation of the rotor power coefficient as an indicator for a large change in the wind conditions causes a modified control strategy to be initiated around t=25 s, 310, from where the turbine is stopped. The stopping based on the rotor power coefficient is hence initiated 8 seconds earlier than by the conventional control method based on yaw error supervision from wind vane measurements. As can be seen from the figure, the stopping is thereby initiated sufficiently early to avoid the otherwise resulting large tilt moments.

In FIG. 4 is shown a time series with normal production and with the control method implemented according to the above. The wind speed 401 and the wind direction 402 as a function of time are shown in the two first curves, which wind load conditions result in the rotor power coefficient by the solid grey line in the lowermost curve 403. In a black dashed line is shown the rotor power coefficient filtered with a fast lowpass filter $Cp_{fast}$, 404 and which is nearly coinciding with the unfiltered Cp. The dotted line 405 shows the rotor power coefficient filtered with a slow lowpass filter and minus an alert threshold; ($C_{P,slow}$-T) similar to the curves in FIG. 2.

It can be seen from FIG. 4 that under these wind conditions, the variation parameter Avar=$Cp_{slow}$-$Cp_{fast}$ does not exceed the alert threshold T, i.e. the curve of the fast filtered Cp,fast, 404 does not come below the curve of the slow filtered value Cp,slow minus the fixed value of the alert threshold T, 405, although it is close around t=450 s, 410. Thus, the modified control strategy of e.g. stopping or de-rating the wind turbine is not triggered during this normal operation of the wind turbine, which is advantageous as the power production of the wind turbine is hence not lowered, unnecessarily.

As previously mentioned, the variation parameter Avar may alternatively or additionally be determined based on the rotor torque coefficient of the wind turbine due to its direct relationship to the rotor power coefficient via the tip-speed ratio $\lambda$.

In a further embodiment of the invention, the variation parameter Avar is determined based on the thrust coefficient of the wind turbine rather than, or in addition to the rotor power coefficient. The thrust coefficient $C_t$ is defined as:

$$C_T = \frac{T}{\frac{1}{2}\rho V^2 A},$$

where T is the aerodynamic thrust on the rotor, $\rho$ is the air density, V is the wind speed, and A is the rotor swept area. The thrust may e.g. be estimated from the rotor power, the rotor and/or generator speed, the pitch of the blades, and optionally based on look-up tables.

Figure 5:
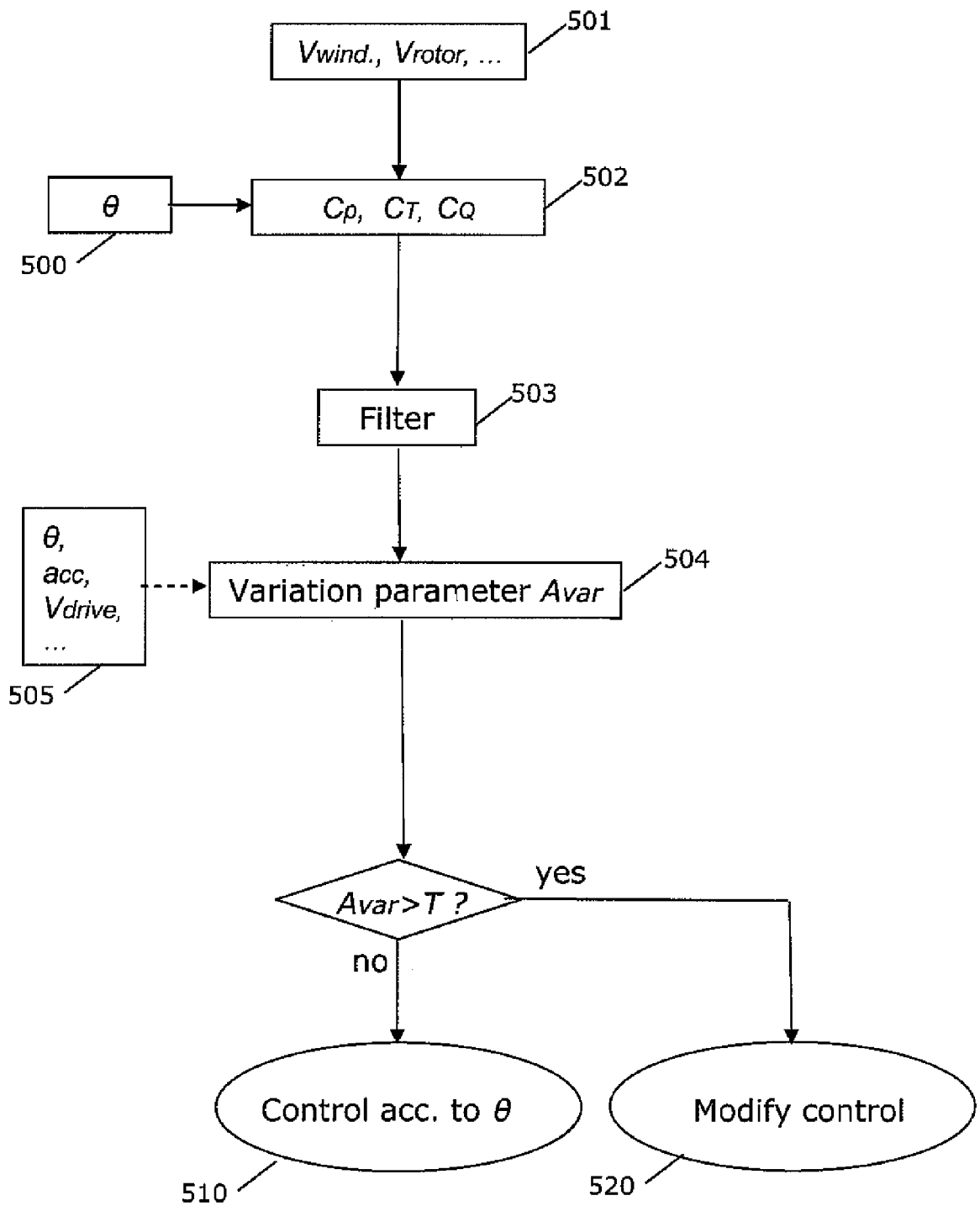
FIG. 5 is a flow-chart illustrating an embodiment of the control method.

From FIG. 4 can be seen that the rotor power coefficient Cp seems to be sensitive not only to the wind direction changes but also to the variation in the wind speed. The rotor power coefficient in general seems to fluctuate more at lower wind speeds. A similar effect is seen on the thrust coefficient. The variation parameter Avar may therefore in embodiments of the invention also be expressed as a function of other sensor signals or measured parameters such as the current wind speed, the pitch of the blades, the drive train speed, or the acceleration of the nacelle. Thereby may be obtained a better tuning of the variation parameter and a higher confidence that the modified control strategy is not initiated during normal operation of the wind turbine The control method according to the invention is illustrated step-by-step in the flowchart in FIG. 5 and as applied to a pitch control parameter. As before, the principle is however the same for other controllable parameters such as for control signals comprising the power reference etc. In each time step and for each sample, a new control signal θ is received from another controller or determined locally, 500. Similarly information is received or obtained on the current rotor power P and other wind turbine parameters such as the tip speed ratio, the wind speed Vwind, rotor thrust T etc, 501. From these parameters is then determined the current rotor power coefficient Cp, rotor torque coefficient CQ, and/or the thrust coefficient CT, 502. The variation parameter Avar is then determined 504 from the filtered values of the rotor power coefficient Cp, rotor torque coefficient CQ, and/or the thrust coefficient CT 503 and optionally also as a function of other current operation parameters such as the current pitch angle, the wind speed, the drive train speed Vdrive, the blade loads, tower acceleration acc etc., 505. In case the variation parameter Avar does not exceed the alert threshold T (which may be a predefined constant or a function of current operating conditions such as the current wind speed) the wind turbine is controlled according to the control signal θ 500 without any intervention 510.

If, on the other hand, the variation parameter Avar exceeds the alert threshold T, the present control strategy is overruled and the wind turbine is controlled according to a modified control strategy, 520. The modified control strategy may as previously mentioned for instance involve stopping the wind turbine, slowing the wind turbine down, or continue to control the wind turbine according to the previous or an even earlier control signal.

The control method may involve storing the information on the rotor power coefficients and/or thrust coefficients optionally together with information on the associated control signals in a control history. Hereby is obtained the possibility of letting the variation parameter Avar be a more complex function of the power and thrust coefficients, and control signals in the control history, such as depending on for instance the second derivatives or higher of the coefficients.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of controlling a wind turbine, comprising the steps of:
    determining a control signal for a controllable parameter of the wind turbine;
    estimating at time intervals at least one of a rotor power coefficient, a torque coefficient, and a thrust coefficient of the wind turbine,
    determining a variation parameter reflecting a variation of said estimated rotor power coefficient, torque coefficient, and/or thrust coefficient over time,
    controlling the wind turbine according to the control signal only if the variation parameter is below an alert threshold, and
    controlling the wind turbine according to a modified control strategy if the variation parameter is above the alert threshold.

2. The method of controlling according to claim 1, where the modified control strategy comprises stopping the wind turbine.

3. The method of controlling according to claim 1, where the modified control strategy comprises de-rating the wind turbine.

4. The method of controlling according to claim 1, where said at least one of the rotor power coefficient, the torque coefficient, and the thrust coefficient is determined from a rotor speed and/or a generator speed of the wind turbine.

5. The method of controlling according to claim 1, where said at least one of the rotor power coefficient, the torque coefficient, and the thrust coefficient is determined from a pitch angle of one or more of the wind turbine blades.

6. The method of controlling according to claim 1, where said at least one of the rotor power coefficient, the torque coefficient, and the thrust coefficient is determined from the wind speed.

7. The method of controlling according to claim 1, where the variation parameter is determined by filtering said at least one of the rotor power coefficient, the torque coefficient, and the thrust coefficient of the wind turbine.

8. The method of controlling according to claim 7, where the variation parameter is determined as a function of the difference between a fast and a slow low pass filtered rotor power efficiency, torque coefficient, and/or thrust coefficient.

9. The method of controlling according to claim 1, where the variation parameter is determined as a function of a pitch angle of one or more of the wind turbine blades.

10. The method of controlling according to claim 1, where the variation parameter is determined as a function of the acceleration of the wind turbine tower.

11. The method of controlling according to claim 1, where the variation parameter is determined as a function of the drive train speed of the wind turbine.

12. The method of controlling according to claim 1, where the alert threshold is a predefined constant.

13. The method of controlling according to claim 1, where the alert threshold is a function of the wind speed.

14. A control system for a wind turbine configured to perform the steps of:
    determining a control signal for a controllable parameter of the wind turbine;
    estimating at time intervals at least one of a rotor power coefficient, a torque coefficient, and a thrust coefficient of the wind turbine,
    determining a variation parameter reflecting a variation of said estimated rotor power coefficient, torque coefficient, and/or thrust coefficient over time,
    controlling the wind turbine according to the most recent control signal only if the variation parameter is below an alert threshold, and
    controlling the wind turbine according to a modified control strategy if the variation parameter is above the alert threshold.

15. A wind turbine comprising a control system according to claim 14.

* * * * *